Jan. 9, 1951     T. R. PATTERSON     2,537,545
DISPENSING CONTAINER
Filed March 8, 1948     2 Sheets-Sheet 1
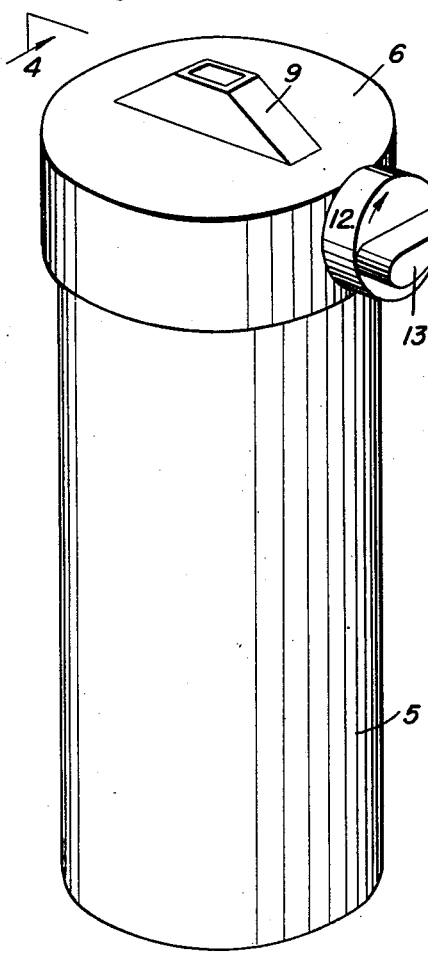
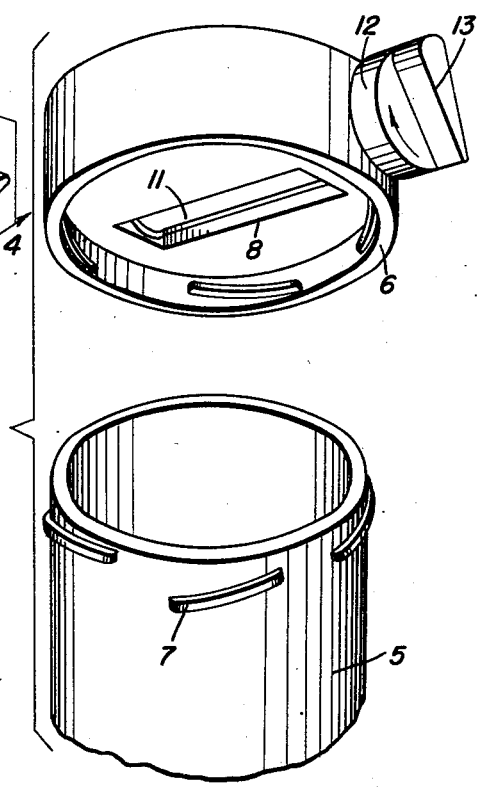
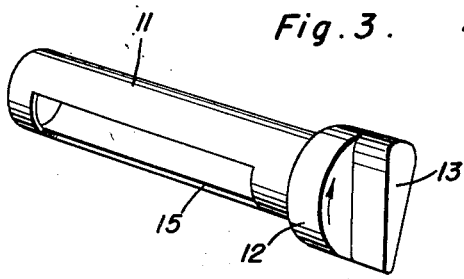
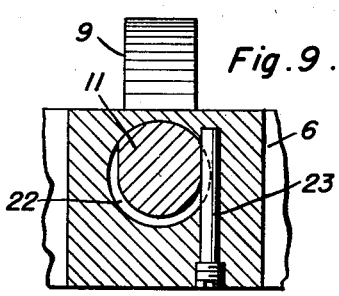
Thomas R. Patterson
INVENTOR.

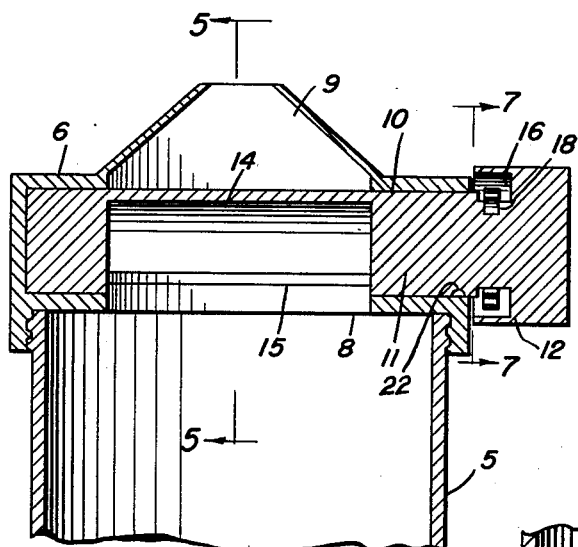
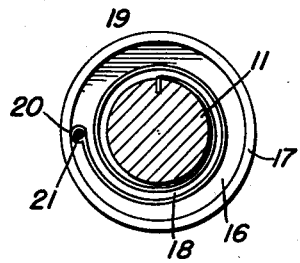
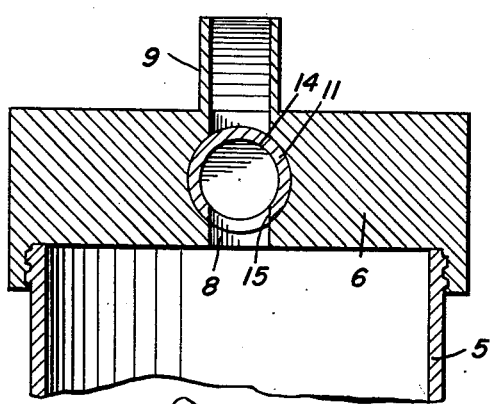
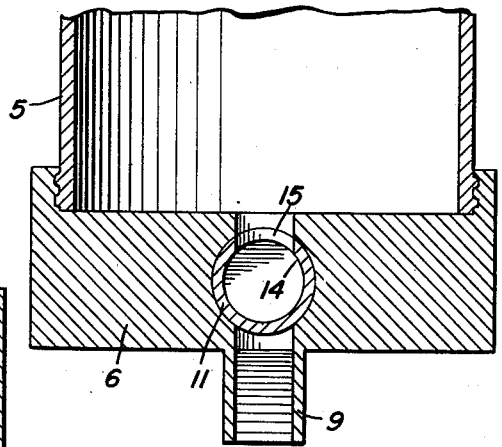
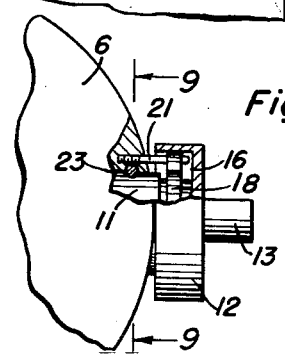

Patented Jan. 9, 1951

2,537,545

UNITED STATES PATENT OFFICE 2,537,545

DISPENSING CONTAINER

Thomas R. Patterson, Petaluma, Calif.

Application March 8, 1948, Serial No. 13,611

2 Claims. (Cl. 222—339)

The present invention relates to new and useful improvements in measuring containers and more particularly to a container for dispensing measured quantities of granulated material, such as sugar or the like.

An important object of the invention is to provide a measuring cylinder mounted in a dispensing cap detachably secured to a jar or other container, the cylinder being retatably carried by the cap for movement into its filling and dispensing position.

A further object of the invention is to provide spring means normally holding the cylinder in a position for filling by inverting the container and with the dispensing spout closed to prevent the entrance of dirt, dust or other foreign matter into the container, when not in use.

A still further object is to provided a measuring container of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a group perspective view showing the cap removed from the container;

Figure 3 is a perspective view of the measuring cylinder;

Figure 4 is a fragmentary vertical sectional view taken substantially on a line 4—4 of Figure 1;

Figure 5 is a fragmentary vertical sectional view taken substantially on a line 5—5 of Figure 4;

Figure 6 is a similar view showing the container inverted for filling the measuring cylinder;

Figure 7 is a transverse sectional view of the knob for the cylinder taken on a line 7—7 of Figure 4 and showing the spring for holding the cylinder in a closed position;

Figure 8 is a fragmentary top plan view with parts broken away and shown in section and showing the combined stop pin for the cylinder and anchoring pin for the spring; and Figure 9 is an enlarged sectional view taken substantially on a line 9—9 of Figure 8.

Referring now to the drawings in detail wherein for the purpose of illustration I have disclosed a preferred embodiment of the invention the numeral 5 designates a container in the form of a jar and to which a cap 6 is threadedly engaged by interrupted threads 7.

The cap is formed with a discharge passage 8 leading to a tapering spout 9, the passage being intersected by a transverse bore 10 in which a measuring cylinder 11 is rotatably mounted, one end of the cylinder projecting outwardly at one side of the cap and formed with a circular head 12 having a transverse finger grip 13 at its outer surface.

The central portion of cylinder 11 is formed with a chamber 14 open at one side by means of a longitudinal extending slot 15 registering with the passage 8.

The inner end of the head 12 is formed with an annular groove 16 closed at the periphery of the head by a skirt 17 and in which a coil spring 18 is positioned with one end 19 thereof anchored to cylinder 11 and its other end 20 anchored to a pin 21 threaded at the side of the cap and projecting into groove 16.

A circumferential groove 22 partly surrounds cylinder 11 and in which is positioned one side of a stop pin 23 threaded into the cap at one side of the cylinder to limit movement thereof to a 180° rotation to alternately register opening 15 with passage 8 or spout 9.

In the operation of the device the spring 18 normally holds the cylinder 11 with the opening 15 registered with passage 8 in filling position, whereby the chamber 14 may be filled when container 5 is inverted. Cylinder 11 is then rotated to close passage 8 and register opening 15 with spout 9 to dispense the contents of the chamber.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A measuring dispenser comprising a container having a cap provided with a discharge passage and a bore open at one end at one side of the cap and intersecting the passage, a cylinder rotatably mounted in the bore and having a chamber, one side of the chamber having an opening registering with the passage at the inner and outer sides of the cap to alternately fill and discharge the chamber upon a rotation of the cylinder when the container is held in an inverted position, one end of said cylinder projecting outwardly of the cap a manipulating head on the outer end of the cylinder and having an annular groove at its inner side closed against the side of the cap, and spring means enclosed in the groove and normally holding the cylinder in a filling position.

2. A measuring dispenser comprising a container having a cap provided with a discharge passage and a bore open at one end at one side of the cap and intersecting the passage, a cylinder rotatable in the bore and having a chamber provided with an opening in one side alternately registering the inner and outer ends of the passage to fill and discharge the chamber when the container is held in an inverted position, one end of said cylinder projecting outwardly of the cap a head on the outer end of the cylinder and having a circumferential groove at its inner side closed against the side of the cap, a pin projecting from the cap into the groove, a coil spring enclosed in the groove connecting the cylinder to the pin and normally holding the cylinder in its filling position, said cylinder also having a partial circumferential groove, and a stop pin carried by the cap at one side of the cylinder and seated in the last named groove to limit rotation of the cylinder in opposite directions, said stop pin also locking the cylinder against endwise movement in the bore of the cap.

THOMAS R. PATTERSON.

REFERENCES CITED

The following references are of record in the file of this patent:

UNITED STATES PATENTS

| Number | Name | Date |
|---|---|---|
| 523,184 | Thompson et al. | July 17, 1894 |
| 1,053,169 | Gillespie | Feb. 18, 1913 |
| 1,728,526 | Brunhoff | Sept. 17, 1929 |
| 1,772,377 | Whittle | Aug. 5, 1930 |
| 2,064,719 | Baldwin | Dec. 15, 1936 |
| 2,109,795 | Hall | Mar. 1, 1938 |